United States Patent

Kuiper et al.

[15] 3,671,880

[45] June 20, 1972

[54] DEVICE FOR GENERATING A PLURALITY OF SINUSOIDAL OSCILLATIONS IN A CARRIER TELEPHONY SYSTEM

[72] Inventors: Wilhelmus Gerardus Kuiper; Anne Klaassen, both of Hilversum, Netherlands

[73] Assignee: U.S. Philips Corporation, New York, N.Y.

[22] Filed: Jan. 25, 1971

[21] Appl. No.: 109,216

[30] Foreign Application Priority Data

Feb. 5, 1970 Netherlands..........................7001606

[52] U.S. Cl.....................................331/51, 331/60, 331/76, 179/15 AN, 328/25

[51] Int. Cl...........................................................H04j 3/10

[58] Field of Search....................179/15; 331/60, 75, 76, 77, 331/51; 328/25

*Primary Examiner*—John Kominski

*Attorney*—Frank R. Trifari

[57] ABSTRACT

A device for generating carrier oscillation while using astable relaxation generators which are synchronized by a common master oscillator. The astable relaxation generators in the output circuits of the common master oscillator include a supervising device which is constituted by a cascade circuit of a rectifier device, a voltage comparison stage and a blocking stage to suppress the cross-talk between the carrier channels due to erroneously generated frequencies when synchronization is lost.

6 Claims, 3 Drawing Figures

INVENTORS
WILHELMUS G. KUIPER
ANNE KLAASSEN
BY [signature]
AGENT

*INVENTORS*
WILHELMUS G. KUIPER
ANNE KLAASSEN
BY

AGENT

INVENTORS
WILHELMUS G. KUIPER
ANNE KLAASSEN
BY [signature]
AGENT

DEVICE FOR GENERATING A PLURALITY OF SINUSOIDAL OSCILLATIONS IN A CARRIER TELEPHONY SYSTEM

The invention relates to a device used in carrier telephony systems for generating a plurality of sinusoidal oscillations comprising a common master oscillator a plurality of frequency dividers each constituted by an astable relaxation generator means for applying, an oscillation derived from the common master oscillator as a synchronizing signal to the input circuit of said astable relaxation generator, the output circuit of said astable relaxation generator being provided with a tuned circuit from which the relevant sinusoidal oscillation is derived for application to an output line. Such devices are particularly useful for generating channel carriers, and group carriers, but they may also be used for generating pilot and signalling frequencies.

Different devices are known for generating carriers in carrier telephony systems. In a first known device the sinusoidal oscillation originating from a master oscillator is converted by means of a non-linear element — for example a coil having a saturable core — into a periodical needle-shaped pulse series, whereafter the higher harmonics in the needle-shaped pulse series constituting the desired carriers are selected with the aid of filters. In this device special attention must be paid to the form of the filters because the relative bandwidth of the filters decreases for the higher carrier frequencies.

In a further known device for carrier generation the different carrier frequencies are derived from a master oscillator with the aid of passive frequency dividers which provide an output signal only in the presence of an input signal, but in which the difficulty is encountered that especially at the comparatively high division factors it is uncertain whether the frequency of the master oscillator is divided by the correct division factor.

Both these drawbacks of the known devices for carrier generation, namely the complicated output filters and the uncertainty in the division factors are obviated by using a device of the type mentioned in the preamble, but it has been found that under particular circumstances the cross-talk level between the channels in the carrier telephony system is increased.

An object of the present invention is to obviate this difficulty in a simple manner in a device mentioned in the preamble, while maintaining its advantages and thereby to improve its practical usability to a considerable extent.

The device according to the invention is characterized in that each astable relaxation generator including its tuned circuit is provided with a supervising device comprising a rectifier device connected to the tuned circuit and a subsequent voltage comparison stage for comparing the output voltage of the rectifier device with a constant reference voltage to produce a control signal which blocks a blocking stage located between the output line and the tuned circuit when the output voltage of the rectifier device decreases in value.

In order that the invention may be readily carried into effect, some embodiments thereof will now be described in detail, by way of example, with reference to the accompanying diagrammatic drawings, in which.

Figure 1:
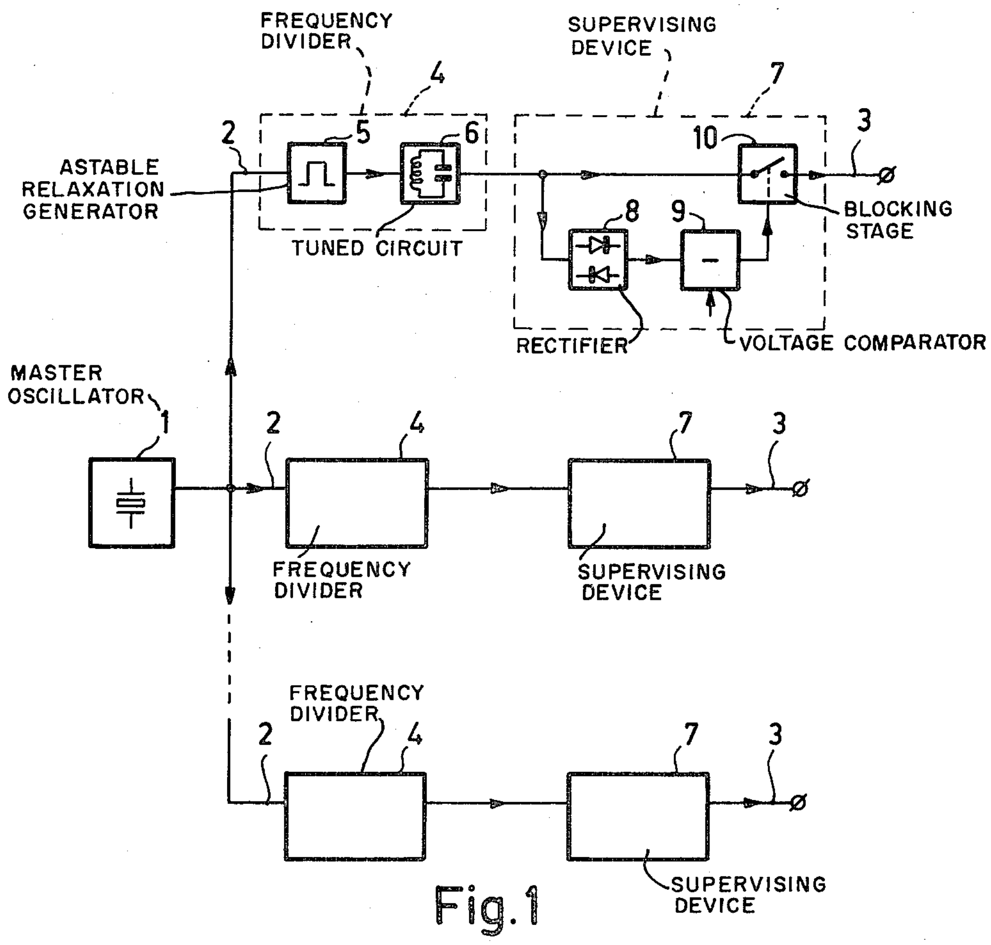
FIG. 1 is a block diagram of a device according to the invention for generating sinusoidal oscillations.

In the device shown in FIG. 1 for generating a plurality of carriers in a carrier telephony system the carrier frequencies are derived from a common master oscillator 1 whose frequency of, for example, 3,360 kHz is generated by a crystal oscillator. The device includes a plurality of parallel-arranged channels 2, three of which are shown in the Figure, and from whose output lines 3 carriers having a frequency of, for example, 672, 480 and 420 kHz are derived which for further carrier generation are optionally utilized, for example, by means of further frequency division, mixing or frequency multiplication.

The different parallel-arranged channels 2 are identical in their construction and for this reason the Figure shows only one channel in greater detail, while the corresponding elements in the other channels are denoted by the same reference numerals.

For generating the different carrier frequencies each parallel-arranged channel 2 includes an astable relaxation generator 5 constituted by a frequency divider 4, whose relaxation oscillation is generated, for example, because the collector circuit of a transistor is positively fed back to the emitter circuit by means of a transformer. A tuned circuit 6 which is present in the output circuit of this relaxation generator 5 selects the carrier whose frequency is equal to the fundamental frequency or a low harmonic of the relaxation oscillation and applies it to the output line 3. The tuned circuits 6 in the output circuits of the relaxation generators 5 are very simple in construction because the relative frequency difference between the fundamental frequency and the low harmonic frequencies is large.

In order to obtain constant relations between the frequency of the master oscillator 1 and the frequencies of the carriers in the output lines 3 of the parallel-arranged channels 2, the oscillation of master oscillator 1 is applied, optionally through a pulse shaper, as a synchronizing signal to the input circuits of the frequency dividers 4 which will consequently generate a synchronizing frequency which is equal to an integral fraction of the frequency of master oscillator 1.

Satisfactory results were achieved in practice with the device described, but under certain circumstances the cross-talk level between the channels was found to increase. Applicant has found from experiments that the increase in cross-talk level is caused by the loss of synchronization between the astable relaxation generators 5 in the parallel-arranged channels 2 and the common master oscillator 1. As a result the relevant astable relaxation generator 5 will generate a frequency which deviates from its synchronizing frequency and this results in an increase of the crosstalk level in the adjacent channels of the carrier telephony system.

In accordance with the invention this increase in the cross-talk level is obviated in a simple manner in that the astable relaxation generator 5 including its tuned circuit 6 is provided with a supervising device 7 comprising a rectifier device 8 connected to the tuned circuit 6 and a subsequent voltage comparison stage 9 for comparing the output voltage of the rectifier device 8 with a constant reference voltage to produce a control signal which blocks a blocking stage 10 located between the output line 3 and the tuned circuit 6 when the output voltage of the rectifier device 8 decreases in value.

Starting from the normal operating condition in which the astable relaxation generator 5 is synchronized by the synchronizing signal derived from the master oscillator 1 and in which the circuit 6 in the output circuit is tuned to the frequency of the carrier to be selected, the voltage across the tuned circuit 6 as well as the direct voltage obtained by rectification and being present in the output circuit of the rectifier device 8 have a maximum value, which direct voltage provides the control voltage for the blocking stage 10 after voltage comparison with the reference voltage in the voltage comparison stage 9. In this normal operating condition the blocking stage 10 establishes the connection between the tuned circuit 6 and the output line 3 so that the carrier selected with the aid of circuit 6 can reach the output line 3 uninterrupted.

If the astable relaxation generator 5 is no longer synchronized by the master oscillator 1, the astable relaxation generator 5 will generate a relaxation frequency deviating from the synchronizing frequency. Since the tuned circuit 6 converts a comparatively small frequency variation of the signal into a comparatively large amplitude decrease, the amplitude of the voltage across the tuned circuit 6 will decrease greatly. For example, in a circuit having a quality factor $Q = 25$ the amplitude of the voltage will decrease by approximately 30 percent if the frequency varies only by 2 percent. As a result a control voltage blocking the blocking stage 10 is produced after rectification and voltage comparison in the output circuit of the voltage comparison stage 9. Particularly, a sensitive and reliable control for supervising the frequency of the carrier is obtained in a very simple manner with the aid of the circuit 6 which is already present for selection of the desired carrier. In this non-synchronized state of the astable relaxation generator 5 the signal provided by the tuned circuit 6 cannot reach the output line 3 because blocking stage 10 is blocked so that cross-talk to the adjacent channels is avoided. However, the relaxation generator 5 continues to generate in this state so that, after synchronization has been restored, the direct voltage in the output circuit of the rectifier device 8 rapidly assumes the maximum value without additional steps such as, for example, special starting equipment. This direct voltage then causes the blocking stage 10 to reestablish the connection between the tuned circuit and the output line. Without additional equipment, the device is brought back to its normal operating condition in this manner.

Thus, the device described is characterized by its simple construction, reliable operation and sensitive frequency supervision, which features make the device particularly attractive for use in practice. In addition to these advantages the output voltage in the output line 3 may be stabilized in a simple manner with the aid of the device described by forming the voltage comparison stage 9 in accordance with a further aspect of the present invention as a variable attenuation network as will now be described in greater detail with reference to FIGS. 2 and 3.

Figure 2:
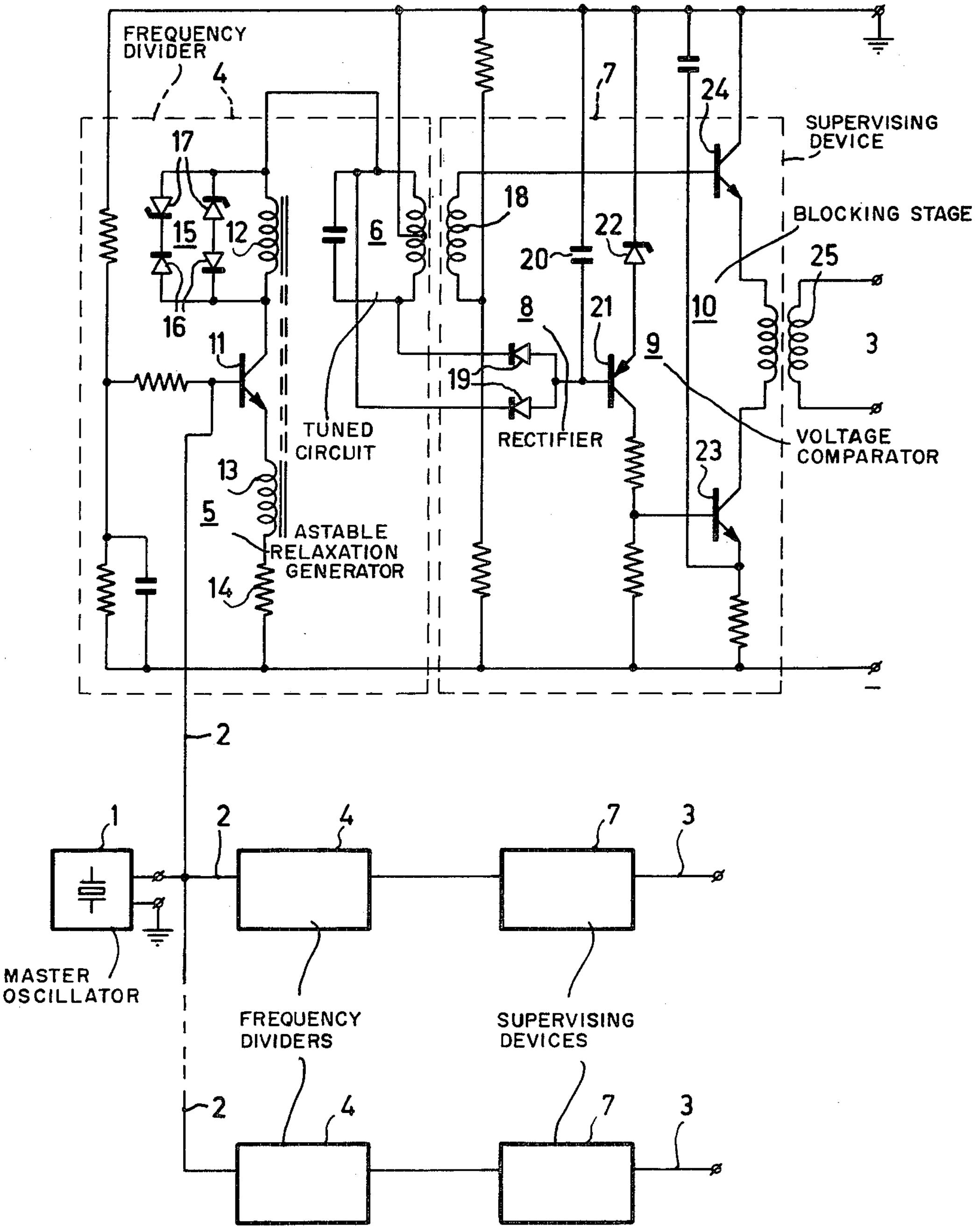
FIGS. 2 and 3 show detailed embodiments of the device of FIG. 1.
Figure 3:
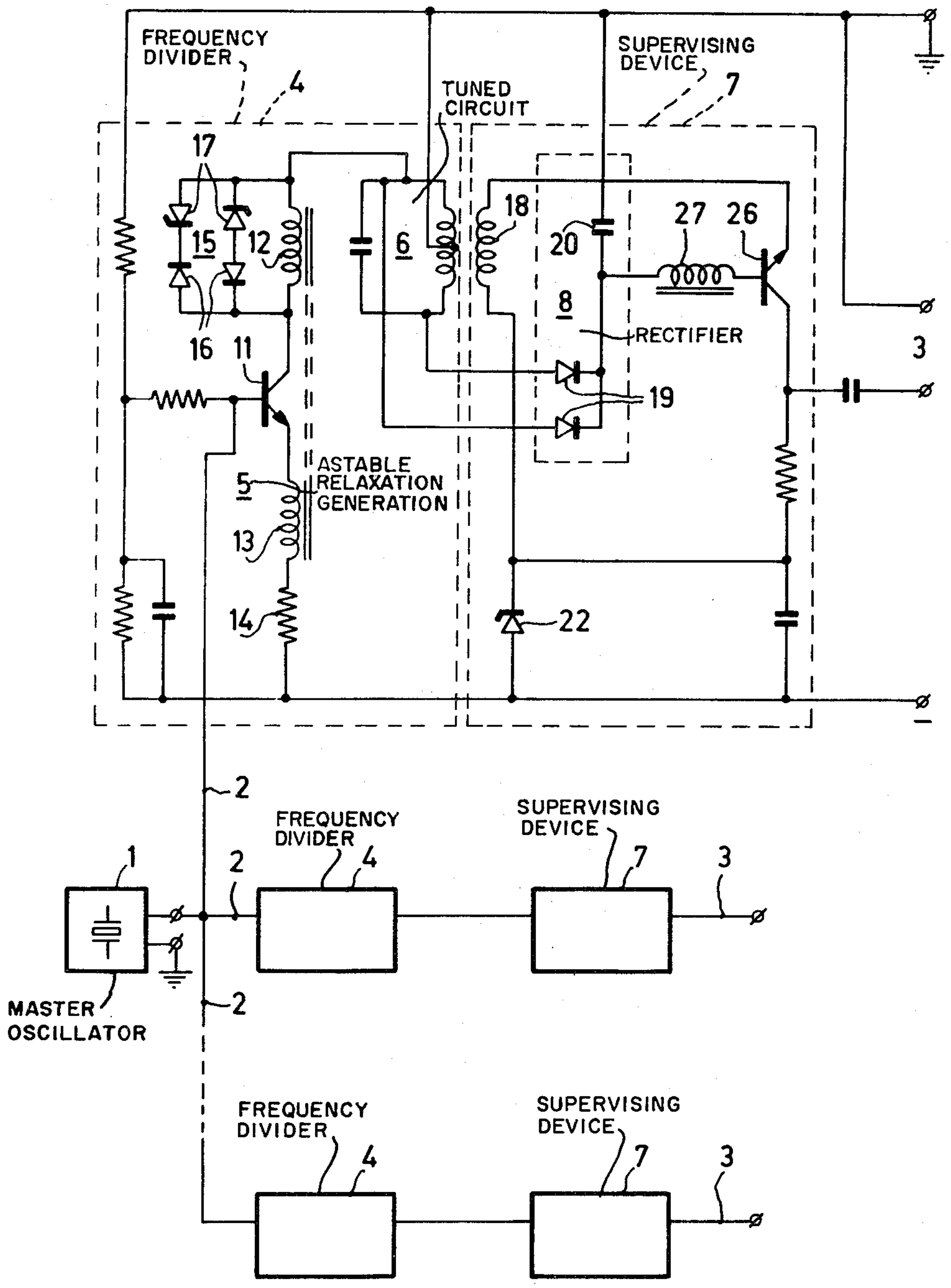

Particularly the steps taken according to the invention for the astable relaxation generator 5 formed as a frequency divider 4 and shown in FIGS. 2 and 3 has great advantages.

FIG. 2 shows an embodiment of the device according to the invention, in which one carrier channel has been shown in greater detail.

In this embodiment the astable relaxation generator 5 formed as a frequency divider 4 is built up in the manner already described in the U.S. Pat. No. 3,440,564. This astable relaxation generator 5 includes a transistor 11 arranged in common base configuration whose collector circuit is positively fed back to the emitter circuit by means of a series coil 12 included in the collector circuit, and a feedback coil 13 included in the emitter circuit. The emitter circuit comprises in series with the feedback coil 13 a resistor 14 operating as a current limiter while the series coil 12 in the collector circuit is shunted by a voltage limiter 15 which limits the voltage across the series coil 12 at a maximum value +E and a minimum value −E. In this case the voltage limiter 15 is constituted by two parallel branches each including the series arrangement of a normal diode 16 and a Zener diode 17.

A square-wave voltage which induces a square-wave voltage in the emitter circuit through the feedback coil 13 is generated in the relaxation generator 5 across the series coil 12 in the collector circuit. Consequently, a square-wave current will flow in the emitter circuit, which current is equal to the induced emitter voltage divided by the current limiting resistor 14. As a result a collector current is produced in the collector circuit, which current is equal in value to the product of the emitter current and the current amplification factor $\alpha$ of transistor 11.

As described in greater detail in U.S. Pat. No. 3,440,564 the relaxation process of the astable relaxation generator 5 is based on the distribution of the collector current across the series coil 12 and the voltage limiter 15. Particularly if the collector current changes from its minimum value to its maximum value, the current flowing through the series coil 12 will increase linearly, namely at a rate which is determined by the value of the inductance of series coil 12 while the voltage limiter 15 takes up the other portion of the collector current. The increase in current flowing through the series coil 12 is continued until the entire collector current flows through the series coil 12 whereafter the voltage across the series coil 12 will decrease. This decrease causes the voltage across the series coil 12 to be reverted to the minimum limiting value −E through the positive feedback.

In this state the collector current of transistor 11 is at a minimum so that the current flowing through the series coil 12 will gradually decrease and the remaining portion of the current in the collector circuit will be taken up by the voltage limiter 15 until the current flowing through the series coil 12 is equal to the collector current. The relaxation generator 5 then assumes the astable state in which the collector current is maximum, whereafter the cycle described hereinbefore is repeated.

Frequency division by a factor of 10 is possible in a simple manner with the previously described astable relaxation generator 5 which in this case is synchronized by applying a synchronizing signal derived from the master oscillator 1 to the base electrode. The desired carrier oscillation is selected by means of a tuned circuit 6 included in the collector circuit in series with the series coil 12, which carrier is derived for further handling from the circuit 6 with the aid of a coupling coil 18.

Like the astable relaxation generator 5 formed as a frequency divider 4, the supervising device 7 already shown in a block diagram in FIG. 1 is also shown in greater detail in FIG. 2. It comprises a rectifier device 8 formed by rectifiers 19 connected to the ends of the tuned circuit 6 and a smoothing capacitor 20 followed by a voltage comparison stage 9 in the form of a transistor 21 for comparing the output voltage of the rectifier device 8 with the Zener voltage of a Zener diode 22 included in the emitter circuit of transistor 21. The blocking transistor 24 operating as an amplifier is controlled through an auxiliary transistor 23 in the blocking stage 10 by means of the control signal generated by the voltage comparison stage 9, the base electrode of said blocking transistor 24 being connected to the coupling coil 18 and the emitter circuit being connected to the output line 3 through a transformer 25.

As already described with reference to FIG. 1, the voltage across the tuned circuit 6 as well as the voltage across the capacitor 20 of the rectifier device 8 will have a maximum value in the synchronized state of the astable relaxation generator 5. This results in the transistor 21 as well as the auxiliary transistor 23 in the blocking stage 10 being bottomed so that the blocking transistor 24 is biased to operate as a class A amplifier, while the carrier oscillations derived from the circuit 6 by the coupling coil 18 are applied through this transistor 24 to the output line 3.

At the same time a particularly effective amplitude stabilization is obtained in this state with the supervising device 7. If the voltage across the tuned circuit 6 increases, for example, by a variation of the load in the output line 3, the load resistance of the rectifier device 8 which resistance is constituted by the conducting transistor 21 and the conducting Zener diode 22 will decrease and the load of the tuned circuit 6 will increase so that the occurring voltage increase is counteracted. Conversely, when the voltage across the circuit 6 decreases the load will likewise decrease so that the occurring voltage decrease is counteracted. Particularly the voltage in the output line 3 is maintained constant within ± 1 percent in case of highly varying operating conditions, notably the simultaneous occurrence of a temperature variation of between 0° C. and 50° C., a supply voltage variation of ± 5 percent and a load variation of from zero to full load.

If the synchronization of the relaxation generator 5 in the device described is lost, the voltage at the output of the rectifier device 8 will be decreased, as already noted with reference to the description of FIG. 1, and this will result in the transistor 21 and the auxiliary transistor 23 being cut off so that the supply circuit of the blocking transistor 24 is interrupted. The oscillations derived from the circuit 6 can then no longer reach the output line 3.

The use of the previously mentioned astable relaxation generator 5 in the device according to the present invention provides considerable advantages. Particularly a very sensitive supervision is obtained at a slightly critical adjustment because the frequency difference between the synchronizing frequency and the relaxation frequency may be chosen to be comparatively large, for example, 7 percent without the risk of an incorrect division ratio occurring. This comparatively large frequency difference is possible in those cases where, as already described in the U.S. Pat. No. 3,440,564, this astable relaxation generator 5 only provides frequency divisions in which the division factor is exclusively even or odd dependent on the manner in which synchronization is performed.

FIG. 3 shows a considerable simplification of the device of FIG. 2, if amplification of the output signal is not necessary. In this Figure particularly the voltage comparison stage 9 and the blocking stage 10 have been combined to one stage comprising one transistor 26 only. The base electrode is connected through a choke coil 27 to the output circuit of the rectifier device 8 and the collector circuit is connected to the output line 3 while the emitter circuit includes in series with the Zener diode 22 the coupling coil 18 coupled to the tuned circuit 6.

The operation of this device is identical to the operation of the device shown in FIG. 2. Particularly in the synchronized state of the astable relaxation generator 5 the transistor 26 arranged as the blocking stage 10 and simultaneously performing the function of the voltage comparison stage 9 will be bottomed by the output voltage of the rectifier device 8 so that the generated carrier is passed on to the output line 3 through the collector circuit of transistor 26. When the synchronization of the astable relaxation generator 5 is lost then in the manner as described with reference to FIG. 2, the output voltage of the rectifier device 8 will not exceed the Zener voltage and the transistor 26 will be in its cut-off state, so that the connection from the coupling coil 18 to the output line 3 is interrupted.

In addition to simplicity in construction and together with a particularly favorable carrier generation, the advantages of the device shown in FIG. 2, viz. a sensitive supervision of the frequency and an effective stabilization of the output voltage at a slightly critical adjustment are also obtained.

In this respect it is to be noted that considering the efficiency of the astable relaxation generator 5 it is found to be advantageous to include the feedback coil 13 in the base circuit. In this embodiment and in the embodiment shown in FIGS. 2 and 3 the base-emitter circuit thus always comprises the feedback coil 13 while the emitter circuit includes the limiting resistor 14. Furthermore it is to be noted that an additional advantage of the present invention is provided by the fact that the supervising device 7 need only be provided near the last divider stage of the circuit required for generating a desired carrier.

WHAT IS CLAIMED IS:

1. A device used in a carrier telephony systems for generating a plurality of sinusoidal oscillations comprising a common master oscillator, a plurality of frequency dividers each constituted by an astable relaxation generator, means for applying an oscillation derived from the common master oscillator as a synchronizing signal to the input circuit of said astable relaxation generator, the output circuit of said astable relaxation generator being provided with a tuned circuit from which the relevant sinusoidal oscillation is derived for application to an output line, characterized in that each astable relaxation generator including its tuned circuit is provided with a supervising device comprising a rectifier device connected to the tuned circuit and a subsequent voltage comparison stage for comparing the output voltage of the rectifier device with a constant reference voltage to produce a control signal which blocks a blocking stage located between the output line and said tuned circuit when the output voltage of the rectifier device decreases in value.

2. A device as claimed in claim 1, characterized in that the voltage comparison stage is formed as a variable attenuation network.

3. A device as claimed in claim 2, characterized in that the voltage comparison stage is constituted by a transistor whose emitter circuit includes a Zener diode for producing said reference voltage.

4. A device as claimed in claim 1, characterized in that the blocking stage is formed by an auxiliary transistor operating as a switch which is included in the supply circuit of the blocking transistor operating as an amplifier whose input circuit is coupled by means of a coupling coil to the tuned circuit and whose output circuit is coupled to the output line.

5. A device as claimed in claim 1, characterized in that the voltage comparison stage and the blocking stage are formed by a combined stage including one transistor, the coupling coil coupled to the tuned circuit being series-arranged in the emitter circuit with the Zener diode for producing said reference voltage, while the base electrode is connected to the output circuit of the rectifier device and the collector circuit is connected to the output line.

6. A device as claimed in claim 1, characterized in that the astable relaxation generator including its tuned circuit comprises a transistor arranged in common base configuration, the collector circuit including a series coil which is inductively fed back to the base-emitter circuit by means of a coupling coil, the series coil in the collector circuit being shunted by a voltage limiter which limits the voltage across the series coil at a certain maximum and a certain minimum value while the emitter circuit includes a resistor operating as a current limiter and the oscillation of the master oscillator is applied to the base electrode.

* * * * *